Sept. 1, 1925.
J. N. POWERS
1,552,230
ROPE OR CABLE COUPLING AND SECURING DEVICE
Filed Nov. 2, 1923
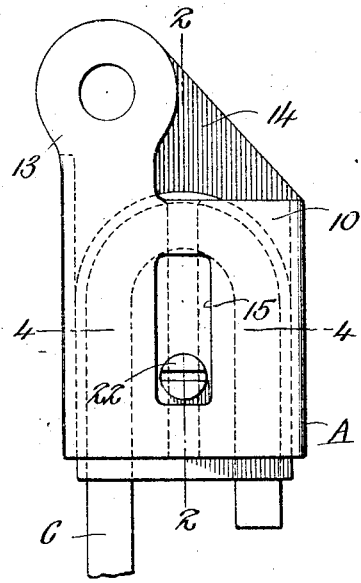
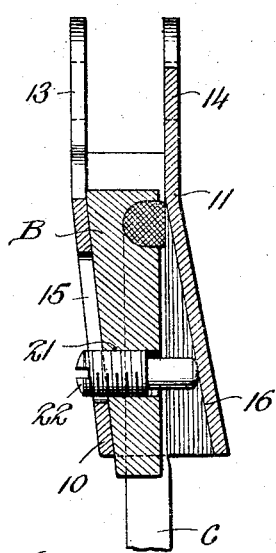
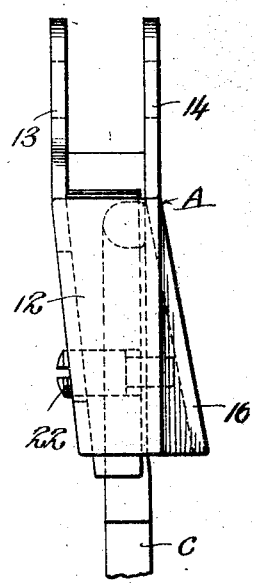
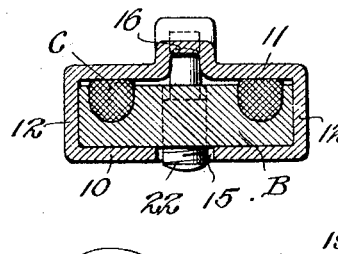
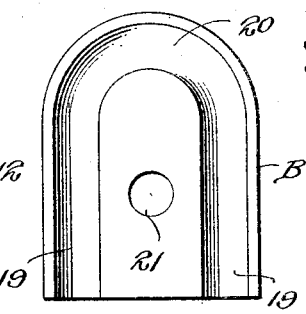
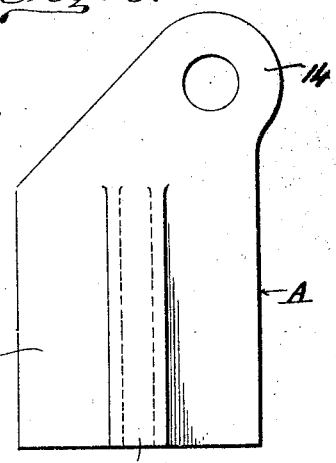
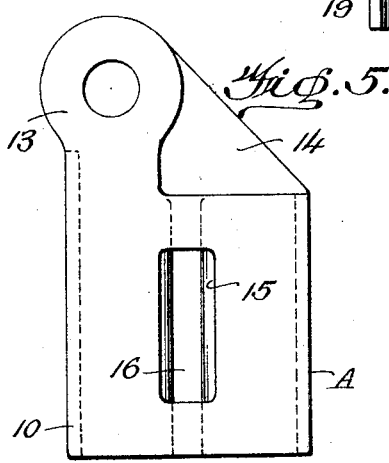
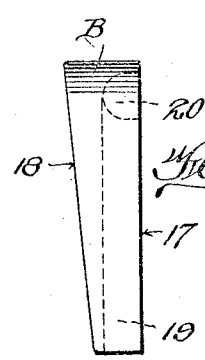
Inventor
John N. Powers,
By Bright & Bailey
Attorneys Patented Sept. 1, 1925.

1,552,230

UNITED STATES PATENT OFFICE.

JOHN N. POWERS, OF WASHINGTON, DISTRICT OF COLUMBIA.

ROPE OR CABLE COUPLING AND SECURING DEVICE.

Application filed November 2, 1923. Serial No. 672,285.

*To all whom it may concern:*

Be it known that I, JOHN N. POWERS, a citizen of the United States, and resident of Washington, in the District of Columbia, have invented certain new and useful Improvements in Rope or Cable Coupling and Securing Devices, of which the following is a specification.

My invention relates to rope or cable coupling and securing devices, my purpose being to provide a simple, inexpensive and efficient device of this kind so constructed that a rope or cable may be gripped without impairing its strength and without damaging strain on the device itself whereby the latter may be constructed of relatively light material.

The device constituting my invention consists essentially of a sheath and a wedge member, between which parts the rope or cable to be secured is adapted to be gripped the construction and arrangement of said sheath and wedge member being such that the rope or cable is gripped with progressively greater force as the pull thereon is increased, and in combination with an arrangement of this kind, it is my further purpose to provide locking means for the wedge member that will operate with progressively increasing force to prevent loosening of the wedge member as the latter may tend through any cause to move in a direction to release its grip on the rope or cable.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views:

Figure 1 is a side elevation of a device constructed in accordance with my invention, a rope or cable being shown gripped therein;

Figure 2, a section on the line 2—2 of Figure 1;

Figure 3, an edge elevation;

Figure 4, a section on the line 4—4 of Figure 1;

Figure 5, a side elevation of the sheath;

Figure 6, an elevation similar to Figure 5 of the other side of the sheath;

Figure 7, an elevation of the wedge member; and

Figure 8, an edge view of the wedge member.

Referring now to the drawings in detail, it will be observed that the sheath A of my improved device is of substantially rectangular shape and includes side walls 10 and 11, respectively, connected by parallel end walls 12, 12 thereby to provide a hollow body adapted to receive the wedge member designated generally at B.

At one end of sheath A the side walls 10 and 11 are provided with extensions 13 and 14, respectively, having alined apertures by means of which an end of a rope or cable may be permanently or detachably secured to the sheath, while from its end that is provided with extension 13, side wall 10 is inclined towards straight side wall 11 in the direction of the other end of the sheath as clearly shown in Figures 2 and 3 of the drawings. In addition, side wall 10 is provided centrally with a longitudinally extending, elongated slot 15, and directly opposite to this slot side wall 11 has a narrow longitudinally extending portion 16 thereof pressed or otherwise inclined outward from its end that is provided with extension 14 in the direction of its other end, the inclination of said portion being greater than the inclination of side wall 10 for a purpose that will presently appear.

Referring now particularly to Figures 7 and 8 of the drawings it will be observed that wedge member B is of a size and shape to be received within sheath A, one side 17 of said member being straight and its other side 18 being inclined from the thicker preferably rounded end of the member towards its other side and end as shown. The inclination of side 18 is the same as the inclination of side wall 10 of sheath A, while as aforesaid side 17 is straight and as clearly shown in Figure 7 is provided with a U-shaped groove or channel including leg portions 19, 19 and a curved connecting portion 20, the former opening through the narrower end of the member and the latter extending contiguous to its curved thicker end. Near its narrower end said member is provided with a transverse threaded opening 21 for the reception of a locking screw 22 that is designed for cooperation with inclined portion 16 of wall 11 to prevent accidental loosening or removal of the wedge member from the sheath.

In the use of my device to couple or secure cable C, screw 22 is removed from wedge member B and the wedge member withdrawn from the sheath, after which the rope or cable C is positioned in the U-shaped channel of the wedge member and the latter inserted within the sheath and screw 22 then passed through slot 15 and threaded in opening 21. The U-shaped channel in wedge member B is of such depth that rope or cable C projects slightly beyond the straight surface 17 of the wedge member, so that when said member is inserted within the sheath with its inclined face 18 in engagement with inclined wall 10 of the sheath, the projecting portion of the rope or cable contacts with the inner face of straight wall 11 of the sheath. Obviously, by reason of this arrangement any pull exerted on either end of the rope or cable tends to move the wedge member through the sheath with the result that the cooperating inclined surfaces on the sheath and wedge member tend to force the wedge member towards side wall 11 of the sheath and as a consequence clamp the rope or cable between the wedge member and sheath with progressively increasing force as the pull on the rope or cable is increased. When the rope or cable has become tightly clamped between the wedge member and sheath, screw 22 is turned until its inner end contacts with inclined portion 16, which portion, due to its greater inclination than wall 10 of the sheath, serves to positively prevent accidental movement of the wedge member in a direction to permit loosening of the rope or cable from its clamped position between the wedge member and the sheath since manifestly any tendency of the wedge member to so move will result in a progressively increasing locking or wedging engagement between the inner end of screw 20 and the aforesaid inclined portion 16.

From the foregoing description considered in connection with the accompanying drawings it is believed that the construction, operation and advantages of my device will be apparent. It is desired to point out, however, that due to forming the U-shaped channel in surface 17 of wedge member B as distinguished from prior art constructions in which the channel is formed in the peripheral edge of the wedge member, strains resulting from the clamping action of the wedge member are distributed between the side and end walls of the sheath, for which reason I am enabled to construct my sheath A of relatively light material. Furthermore, forming the U-shaped channel in face 17 of the wedge member enables me to secure a clamping action throughout the entire length of that portion of the rope or cable that is engaged with the wedge member, and, in addition, such formation of the channel enables me to completely house and thereby protect the rope or cable within the sheath.

I claim:—

1. A device of the character described comprising a sheath and a wedge member, between which a rope or cable to be secured is adapted to be clamped, cooperating inclined surfaces on said sheath and wedge member, respectively, to cause a clamping action upon the rope or cable when the wedge member is moved in a predetermined direction with respect to the sheath, and locking means between said wedge member and sheath operating with progressively increasing locking intensity upon movement of the wedge member with respect to the sheath in a direction to relieve the clamping force upon said rope or cable.

2. A device of the character described comprising a sheath and a wedge member, between which a rope or cable to be secured is adapted to be clamped, cooperating inclined surfaces on said sheath and wedge member, respectively, to cause a clamping action upon the rope or cable when the wedge member is moved in a predetermined direction with respect to the sheath, a second inclined surface on said sheath at a greater inclination than said cooperating inclined surfaces, and a means adjustably carried by said wedge member for cooperation with said last mentioned inclined surface to lock the wedge member against movement from a position in clamping engagement with said rope or cable.

3. A device of the character described comprising a sheath consisting of a hollow body defined by a pair of side walls and a pair of end walls, one of said side walls being inclined with respect to the other and the latter wall having a portion thereof disposed at a greater incline than said first named wall, a wedge member adapted to fit within said sheath and between one face of which and an adjacent face of one of the side walls of said sheath a rope or cable is adapted to be clamped, said wedge member including an inclined surface cooperating with the inclined wall of the sheath to clamp the rope or cable between the wedge member and sheath, and a screw threaded in said wedge member for cooperation with the inclined portions of the aforesaid second named wall of said sheath to lock the wedge member within the sheath in clamping relation to said rope or cable.

4. A device of the character described comprising a sheath and a wedge member between which a rope or cable to be secured is adapted to be clamped, and cooperating inclined wedging surfaces on said sheath and wedge member, respectively, to cause a clamping action upon the rope or cable when the wedge member is moved in a predetermined direction with respect to the sheath, said wedge member having a channel formed therein for the reception of the rope or cable to be secured, said channel being formed in a surface of the wedge member entirely separate from its inclined wedging surface.

5. A device of the character described comprising a sheath and a wedge member between which a rope or cable to be secured is adapted to be clamped, and cooperating inclined wedging surfaces on said sheath and wedge member, respectively, to cause a clamping action upon the rope or cable when the wedge member is moved in a predetermined direction with respect to the sheath, said wedge member having a channel formed therein for the reception of the rope or cable to be secured, said channel being formed entirely in a single side of said wedge member as distinguished from it periphery.

In testimony whereof I hereunto affix my signature.

JOHN N. POWERS.